United States Patent
Jiménez

(10) Patent No.: US 12,316,607 B2
(45) Date of Patent: May 27, 2025

(54) METHODS AND APPARATUS FOR OPERATING AND MANAGING A CONSTRAINED DEVICE WITHIN A NETWORK

(71) Applicant: Telefonaktiebolaget LM Ericsson (publ), Stockholm (SE)

(72) Inventor: Jaime Jiménez, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 649 days.

(21) Appl. No.: 16/979,771

(22) PCT Filed: Mar. 20, 2018

(86) PCT No.: PCT/SE2018/050280
§ 371 (c)(1),
(2) Date: Sep. 10, 2020

(87) PCT Pub. No.: WO2019/182489
PCT Pub. Date: Sep. 26, 2019

(65) Prior Publication Data
US 2021/0367926 A1   Nov. 25, 2021

(51) Int. Cl.
*H04L 9/40* (2022.01)

(52) U.S. Cl.
CPC ...... *H04L 63/0263* (2013.01); *H04L 63/0236* (2013.01); *H04L 63/1416* (2013.01); *H04L 63/1441* (2013.01); *H04L 63/20* (2013.01)

(58) Field of Classification Search
CPC ............. H04L 63/0263; H04L 63/0236; H04L 63/1416; H04L 63/1441; H04L 63/20

(Continued)

(56) References Cited

U.S. PATENT DOCUMENTS 7,296,292 B2 * 11/2007 Chang ................. H04L 63/0218
                                                                713/153
9,807,112 B2 * 10/2017 Bajko ................. H04L 63/1475
(Continued)

FOREIGN PATENT DOCUMENTS

KR        101721511 B1    3/2017
WO        2013061116 A1   5/2013
(Continued)

OTHER PUBLICATIONS

Bormann, C., et al., "CoAP (Constrained Application Protocol) over TCP, TLS, and WebSockets", draft-ietf-core-coap-tcp-tls-09, May 16, 2017, pp. 1-47.

(Continued)

*Primary Examiner* — Teshome Hailu
(74) *Attorney, Agent, or Firm* — Murphy, Bilak & Homiller, PLLC

(57) ABSTRACT

A method (200) is disclosed for operating a constrained device within a network, the network comprising a firewall deployed between the constrained device and a manager. The method comprises receiving from the manager configuration information for an Attack Vector data Object and a Port Control Protocol (PCP) configuration data Object on the constrained device (210). The configuration information comprises a value for a Resource in the Attack Vector data Object (210a) and a value for a Resource in the PCP configuration data Object (210b). The method further comprises sending a PCP Request to the firewall in accordance with the PCP configuration data Object, the PCP Request including the Resource value for the Attack Vector data Object received in the configuration information (220). Also disclosed are methods (400, 500) and apparatus for managing a constrained device.

17 Claims, 13 Drawing Sheets

(58) Field of Classification Search
USPC .......................................................... 726/11
See application file for complete search history.

(56) References Cited

U.S. PATENT DOCUMENTS

| | | | | |
|---|---|---|---|---|
| 11,399,007 | B2* | 7/2022 | Jiménez | H04W 4/38 |
| 2008/0141332 | A1* | 6/2008 | Treinen | H04L 63/1416 |
| | | | | 726/1 |
| 2011/0271112 | A1* | 11/2011 | Bajko | H04L 63/1475 |
| | | | | 713/168 |
| 2013/0201839 | A1* | 8/2013 | Ree | H04L 43/0847 |
| | | | | 370/252 |
| 2014/0359780 | A1 | 12/2014 | Zandani et al. | |
| 2014/0369251 | A1* | 12/2014 | Zhang | H04W 4/08 |
| | | | | 370/312 |
| 2015/0113588 | A1* | 4/2015 | Wing | H04L 63/0227 |
| | | | | 726/1 |
| 2015/0172309 | A1 | 6/2015 | Zandani et al. | |
| 2015/0358284 | A1 | 12/2015 | Arkko et al. | |
| 2016/0028764 | A1 | 1/2016 | Vasseur et al. | |
| 2017/0033984 | A1 | 2/2017 | Lear et al. | |
| 2017/0279775 | A1 | 9/2017 | Savolainen | |

FOREIGN PATENT DOCUMENTS

| | | | |
|---|---|---|---|
| WO | 2017106450 | A1 | 6/2017 |
| WO | 2017176241 | A1 | 10/2017 |
| WO | 2019182487 | A1 | 9/2019 |

OTHER PUBLICATIONS

Bormann, C., et al., "Terminology for Constrained-Node Networks", Internet Engineering Task Force (IETF), May 2014, pp. 1-17.
D., Wing Ed., et al., "Port Control Protocol (PCP)", Internet Engineering Task Force (IETF), Apr. 2013, pp. 1-88.
Edeline, Korian, et al., "Using UDP for Internet Transport Evolution", ETH TIK Technical Report 366, Dec. 22, 2016, pp. 1-12.
Kiesel, S., "Port Control Protocol (PCP) Anycast Addresses", Internet Engineering Task Force (IETF), Jan. 2016, pp. 1-9.
Postel, J., "User Datagram Protocol", RFC 768, Aug. 28, 1980, pp. 1-3.
Shelby, Z., et al., "The Constrained Application Protocol (CoAP)", Internet Engineering Task Force (IETF), Jun. 2014, pp. 1-112.
Unknown, Author, "Lightweight Machine to Machine Technical Specification", Open Mobile Alliance; OMA-TS-LightweightM2M-V1_0_1-20170704-A, Jul. 4, 2017, pp. 1-141.

* cited by examiner

| Resource ID | Name | Type | Default Value |
|---|---|---|---|
| 0 | PCP Version | Integer | Default value is 2. |
| 1 | R | Boolean | Boolean specifying type of message; "0" for request. |
| 2 | IP Address | Long | Preferably global IPv6 address. |
| 3 | PCP Option | Opaque | Describes the Option specififed (e.g. FILTER). |
| 4 | PCP Status | Boolean | If PCP has been successfully enabled then status should be 1. |

Figure 7

| Resource ID | Name | Type | Default Value |
|---|---|---|---|
| 0 | Attack methods | String Array | List of possible REST methods of an attack (default is GET only) in an array list. Example default: [GET, PUT] |
| 1 | Request Threshold | Integer | Number of allowed requests per minute per CoAP Client (default is 30). Example default: 30 |
| 2 | Rules | String | String specifying the rule to be applied if the conditions in Resources 0 and 1 occur. Example default: threshold poll firewall-dos-attack |

Figure 8

```
                            900
0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Option Code=3 |   Reserved    |       Option Length=20        |
+-+-+-+-+-+-+-+-+-+-+-+-+-+-+-+-+-+-+-+-+-+-+-+-+-+-+-+-+-+-+-+-+
|    Reserved   | Prefix Length |       Remote Peer Port        |
+-+-+-+-+-+-+-+-+-+-+-+-+-+-+-+-+-+-+-+-+-+-+-+-+-+-+-+-+-+-+-+-+
|                   Remote Peer IP address (128 bits)           |
+-+-+-+-+-+-+-+-+-+-+-+-+-+-+-+-+-+-+-+-+-+-+-+-+-+-+-+-+-+-+-+-+
|                        Firewall Thresholds                    |
+-+-+-+-+-+-+-+-+-+-+-+-+-+-+-+-+-+-+-+-+-+-+-+-+-+-+-+-+-+-+-+-+
```

METHODS AND APPARATUS FOR OPERATING AND MANAGING A CONSTRAINED DEVICE WITHIN A NETWORK

TECHNICAL FIELD

The present disclosure relates to a method for operating a constrained device within a network and to a method for managing a constrained device within a network. The present disclosure also relates to a constrained device, to a manager for a constrained device and to a computer program and a computer program product configured, when run on a computer to carry out methods performed in a constrained device and a manager for a constrained device.

BACKGROUND

The "Internet of Things" (IoT) refers to devices enabled for communication network connectivity, so that these devices may be remotely managed, and data collected or required by the devices may be exchanged between individual devices and between devices and application servers. Such devices are often subject to severe limitations on processing power, storage capacity, energy supply, device complexity and/or network connectivity, imposed by their operating environment or situation, and may consequently be referred to as constrained devices. Constrained devices may operate according to a range of protocols, including widely used protocols such as Internet Protocol (IP v4 or IPv6, and dedicated protocols for constrained devices, including the Constrained Application Protocol (CoAP), as defined in Internet Engineering Task Force (IETF) RFC7252. CoAP is a generic RESTful application protocol for constrained devices and is designed to be used over the User Datagram Protocol (UDP, defined in IETF RFC0768) over the Internet.

Management of constrained devices may be performed using any suitable management protocol, including for example the Lightweight Machine to Machine (LWM2M) protocol, defined by the Open Mobile Alliance. LWM2M is designed to operate over CoAP.

In IoT deployments, constrained devices may be deployed behind firewalls, which monitor and control both incoming and outgoing traffic according to security rules configured on the firewall. These security rules are developed to counter threats most frequently encountered on the network, and may be based upon IP tables; blocking or allowing certain traffic according to an origin or destination IP address and/or port. Such rules protect network devices from conventional security threats but may be insufficient to protect constrained devices, owing to the particular vulnerabilities of such devices. The limitations on processing power, energy supply etc. to which constrained devices may be subject render them susceptible to attacks seeking to place heavy loads on these resources. Such attacks would have limited impact on non-constrained devices, and consequently conventional firewall security rules are not designed to prevent such attacks, leaving IoT deployments potentially vulnerable to attack, even when deployed behind a firewall.

In the event of an attack, a constrained device is generally unable to take any action to mitigate the effects of the attack. For example, in the event of a Denial of Service (DoS) attack involving an excessive number of information requests directed to a constrained device, the constrained device may simply crash, being unable to process the volume of requests received.

SUMMARY

It is an aim of the present disclosure to provide a method, apparatus and computer readable medium which at least partially address one or more of the challenges discussed above.

According to a first aspect of the present disclosure, there is provided a method for operating a constrained device within a network, the network comprising a firewall deployed between the constrained device and a manager. The method, performed by the constrained device, comprises receiving from the manager configuration information for an Attack Vector data Object and a Port Control Protocol (PCP) configuration data Object on the constrained device, the configuration information comprising a value for a Resource in the Attack Vector data Object and a value for a Resource in the PCP configuration data Object. The method further comprises sending a PCP Request to the firewall in accordance with the PCP configuration data Object, the PCP Request including the Resource value for the Attack Vector data Object received in the configuration information.

According to examples of the present disclosure, the manager may be running a LWM2M server and the PCP configuration data Object on the constrained device may be stored within a LWM2M client running on the constrained device. According to examples of the present disclosure, values for multiple Resources in each of the data Objects may be received in the configuration information.

For the purposes of the present disclosure, a constrained device comprises a device which conforms to the definition set out in section 2.1 of IETF RFC 7228 for "constrained node". According to the definition in IETF RFC 7228, a constrained device is a device in which "some of the characteristics that are otherwise pretty much taken for granted for Internet nodes at the time of writing are not attainable, often due to cost constraints and/or physical constraints on characteristics such as size, weight, and available power and energy. The tight limits on power, memory, and processing resources lead to hard upper bounds on state, code space, and processing cycles, making optimization of energy and network bandwidth usage a dominating consideration in all design requirements. Also, some layer-2 services such as full connectivity and broadcast/multicast may be lacking". Constrained devices are thus clearly distinguished from server systems, desktop, laptop or tablet computers and powerful mobile devices such as smartphones. A constrained device may for example comprise a Machine Type Communication device, a battery powered device or any other device having the above discussed limitations. Examples of constrained devices may include sensors measuring temperature, humidity and gas content, for example within a room or while goods are transported and stored, motion sensors for controlling light bulbs, sensors measuring light that can be used to control shutters, heart rate monitor and other sensors for personal health (continuous monitoring of blood pressure etc.) actuators and connected electronic door locks.

According to examples of the present disclosure, the value for a Resource in the Attack Vector data Object may comprise at least one of a value for an Attack method Resource, a value for an Attack definition threshold Resource, or a value for a Rules Resource.

According to examples of the present disclosure, the Rules resource may contain a rule to be applied in the firewall in the event of the conditions in the Attack method and Attack definition threshold Resources being satisfied.

According to examples of the present disclosure, the PCP Request may contain a policy to be applied in the firewall to traffic directed to the device.

According to examples of the present disclosure, the method may further comprise receiving a PCP Response to the PCP Request, checking a result code of the PCP Response, and, if the result code indicates success, updating a value of a PCP Status Resource in the PCP configuration data Object.

According to examples of the present disclosure, the updated value may indicate successful enablement of PCP on the firewall, establishing a policy to be applied in the firewall to traffic directed to the device.

According to examples of the present disclosure, the method may further comprise receiving from the manager a subscription request for a value of a PCP status Resource in the PCP configuration data Object, and responding to the subscription request with a notification to the manager of the current value of the PCP status Resource.

According to examples of the present disclosure, the method may further comprise, on updating a value of the PCP Status Resource in the PCP configuration data Object, sending a notification to the manager including the updated value of the PCP Status Resource.

According to examples of the present disclosure, the method may further comprise receiving a message from an entity, the entity other than the manager, and receiving from the manager configuration information for the Attack Vector data Object, the configuration information updating a value for a Resource in the Attack Vector data Object.

According to examples of the present disclosure, the updated Resource values may include values for the Attack method Resource or the Attack definition threshold Resource, and may additionally include a value for the Rules resource.

According to examples of the present disclosure, the method may further comprise identifying, on the basis of the updated value in the Attack Vector data Object, the message from the entity as an attack.

According to examples of the present disclosure, the method may further comprise notifying the manager that an attack has been identified.

According to examples of the present disclosure, the method may further comprise saving a characteristic of the message from the entity.

According to examples of the present disclosure, examples of the characteristic or characteristics that may be saved include: origin IP and port of the message, CoAP endpoint name of the entity, MAC, resources requested in the message etc. According to examples of the present disclosure, a saved characteristic of the message from the entity may be included in the notification of attack message sent to the manager.

According to examples of the present disclosure, the method may further comprise sending a further PCP Request to the firewall in accordance with the PCP configuration data Object, the further PCP Request including the updated Resource value for the Attack Vector object.

According to examples of the present disclosure, the further PCP Request may update the policy to be applied in the firewall to traffic directed to the device.

According to examples of the present disclosure, the policy updates may include changing thresholds, new attack methods and/or changes to rules to be applied according to the policy for traffic directed to the constrained device. According to examples of the present disclosure, the further PCP request may include a saved characteristic of the message from the entity.

According to examples of the present disclosure, the method may further comprise receiving a PCP Response to the further PCP Request, and checking a result code of the PCP Response. According to examples of the present disclosure, the method may further comprise updating a value of the PCP Status Resource in the PCP configuration data Object according to the result code of the PCP response, and sending a notification to the manager including the updated value of the PCP Status Resource.

According to another aspect of the present disclosure, there is provided a method for managing a constrained device within a network, the network comprising a firewall deployed between the constrained device and a manager. The method, performed by the manager, comprises configuring an Attack Vector data Object and a PCP configuration data Object on the constrained device by setting a value for a Resource in the Attack Vector data Object and setting a value for a Resource in the PCP configuration data Object.

According to examples of the present disclosure, the method may further comprise triggering the constrained device to send a PCP request to the firewall.

According to examples of the present disclosure, the manager may be running a LWM2M server and the PCP configuration data Object on the constrained device may be stored within a LWM2M client running on the constrained device. According to examples of the present disclosure, values for multiple Resources in each of the data Objects may be set as part of the configuration.

According to examples of the present disclosure, the value for a Resource in the Attack Vector data Object may comprise at least one of a value for an Attack method Resource, a value for an Attack definition threshold Resource, or a value for a Rules Resource.

According to examples of the present disclosure, the Rules resource may contain a rule to be applied in the firewall in the event of the conditions in the Attack method and Attack definition threshold Resources being satisfied.

According to examples of the present disclosure, the method may further comprise monitoring for successful enablement of PCP on the firewall.

According to examples of the present disclosure, successful enablement of PCP on the firewall may comprise the establishing of a policy to be applied in the firewall to traffic directed to the device.

According to examples of the present disclosure, monitoring for successful enablement of PCP on the firewall may comprise subscribing to a value of a PCP status Resource in the PCP configuration data Object on the constrained device.

According to examples of the present disclosure, the method may further comprise receiving a notification from the constrained device that PCP has been successfully enabled on the firewall. The notification may in some examples be a subscription notification of a change in the value of the PCP Status Resource.

According to examples of the present disclosure, the method may further comprise monitoring behaviour of the constrained device, identifying from the behaviour an attack being conducted against the device, determining a value of a Resource in the Attack Vector data Object on the constrained device that will enable the device to identify the attack, and sending the determined value of the Resource to the constrained device as configuration information.

Examples of behaviour that may be monitored and that may be used to identify an attack may include an attempt to access restricted resources, repeated attempts by the same client to access the same resources, excessive number of resource requests etc.

According to examples of the present disclosure, determining a value of a Resource in the Attack Vector data Object on the constrained device that will enable the device to identify the attack may comprise determining an updated value for at least one of a an Attack method Resource or an Attack definition threshold Resource.

According to examples of the present disclosure, the method may further comprise determining a value of a Rules resource in the Attack Vector data Object on the constrained device that will enable the firewall to block the attack, and sending the determined value of the Rules Resource to the constrained device as configuration information. According to examples of the present disclosure, the method may further comprise triggering the constrained device to send a new PCP request to the firewall.

According to examples of the present disclosure, the method may further comprise receiving a notification from the constrained device that an attack has been identified.

According to examples of the present disclosure, a saved characteristic of a message identified by the device as part of the attack may be included in the notification of attack message sent to the manager.

According to examples of the present disclosure, the method may further comprise receiving a notification from the constrained device of successful update of a policy on the firewall.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a constrained device, the constrained device being operable for deployment within a network, the network comprising a firewall deployed between the constrained device and a manager.

The constrained device comprises a processor and a memory, the memory containing instructions executable by the processor such that the constrained device is operable to receive from the manager configuration information for an Attack Vector data Object and a PCP configuration data Object on the constrained device. The configuration information comprises a value for a Resource in the Attack Vector data Object; and a value for a Resource in the PCP configuration data Object. The constrained device is also operable to send a PCP Request to the firewall in accordance with the PCP configuration data Object, the PCP Request including the Resource value for the Attack Vector object received in the configuration information.

According to another aspect of the present disclosure, there is provided a constrained device, the constrained device being operable for deployment within a network, the network comprising a firewall node deployed between the constrained device and a manager. The constrained device is adapted to receive from the manager configuration information for an Attack Vector data Object and a PCP configuration data Object on the constrained device, the configuration information comprising a value for a Resource in the Attack Vector data Object, and a value for a Resource in the PCP configuration data Object. The constrained device is further adapted to send a PCP Request to the firewall in accordance with the PCP configuration data Object, the PCP Request including the Resource value for the Attack Vector object received in the configuration information.

According to another aspect of the present disclosure, there is provided a constrained device, the constrained device being operable for deployment within a network, the network comprising a firewall deployed between the constrained device and a manager. The constrained device comprises a receiving module for receiving from the manager configuration information for an Attack Vector data Object and a PCP configuration data Object on the constrained device, the configuration information comprising a value for a Resource in the Attack Vector data Object and a value for a Resource in the PCP configuration data Object. The constrained device further comprises a transmission module for sending a PCP Request to the firewall in accordance with the PCP configuration data Object, the PCP Request including the Resource value for the Attack Vector object received in the configuration information.

According to another aspect of the present disclosure, there is provided a manager for managing a constrained device within a network, the network comprising a firewall deployed between the constrained device and the manager. The manager comprises a processor and a memory, the memory containing instructions executable by the processor such that the manager is operable to configure an Attack Vector data Object and a PCP configuration data Object on the constrained device by setting a value for a Resource in the Attack Vector data Object and setting a value for a Resource in the PCP configuration data Object.

According to another aspect of the present disclosure, there is provided a manager for managing a constrained device within a network, the network comprising a firewall deployed between the constrained device and the manager. The manager is adapted to configure an Attack Vector data Object and a PCP configuration data Object on the constrained device by setting a value for a Resource in the Attack Vector data Object; and setting a value for a Resource in the PCP configuration data Object.

According to another aspect of the present disclosure, there is provided a manager for managing a constrained device within a network, the network comprising a firewall deployed between the constrained device and the manager. The manager comprises a configuration module for configuring an Attack Vector data Object and a PCP configuration data Object on the constrained device by setting a value for a Resource in the Attack Vector data Object and setting a value for a Resource in the PCP configuration data Object.

BRIEF DESCRIPTION OF THE DRAWINGS

For a better understanding of the present disclosure, and to show more clearly how it may be carried into effect, reference will now be made, by way of example, to the following drawings in which:

FIG. 7 is a diagram illustrating an example data object;

FIG. 8 is a diagram illustrating another example data object;

DETAILED DESCRIPTION

Aspects of the present disclosure provide methods according to which a manager of a constrained device may cause the constrained device to configure a firewall deployed between the manager and the constrained device. The constrained device may configure the firewall such that a policy defined by the manager is applied in the firewall to traffic directed to the constrained device.

Aspects of the present disclosure make use of the Port Control Protocol (PCP), defined in IETF RFC 6887 and IETF RFC 7723. PCP allows for the creation of explicit mappings between an external IP address, protocol and port and an internal IP address, protocol and port. PCP requires a PCP client and a PCP server, and uses a communication pattern of request-response using UDP as the transport protocol.

Figure 1:
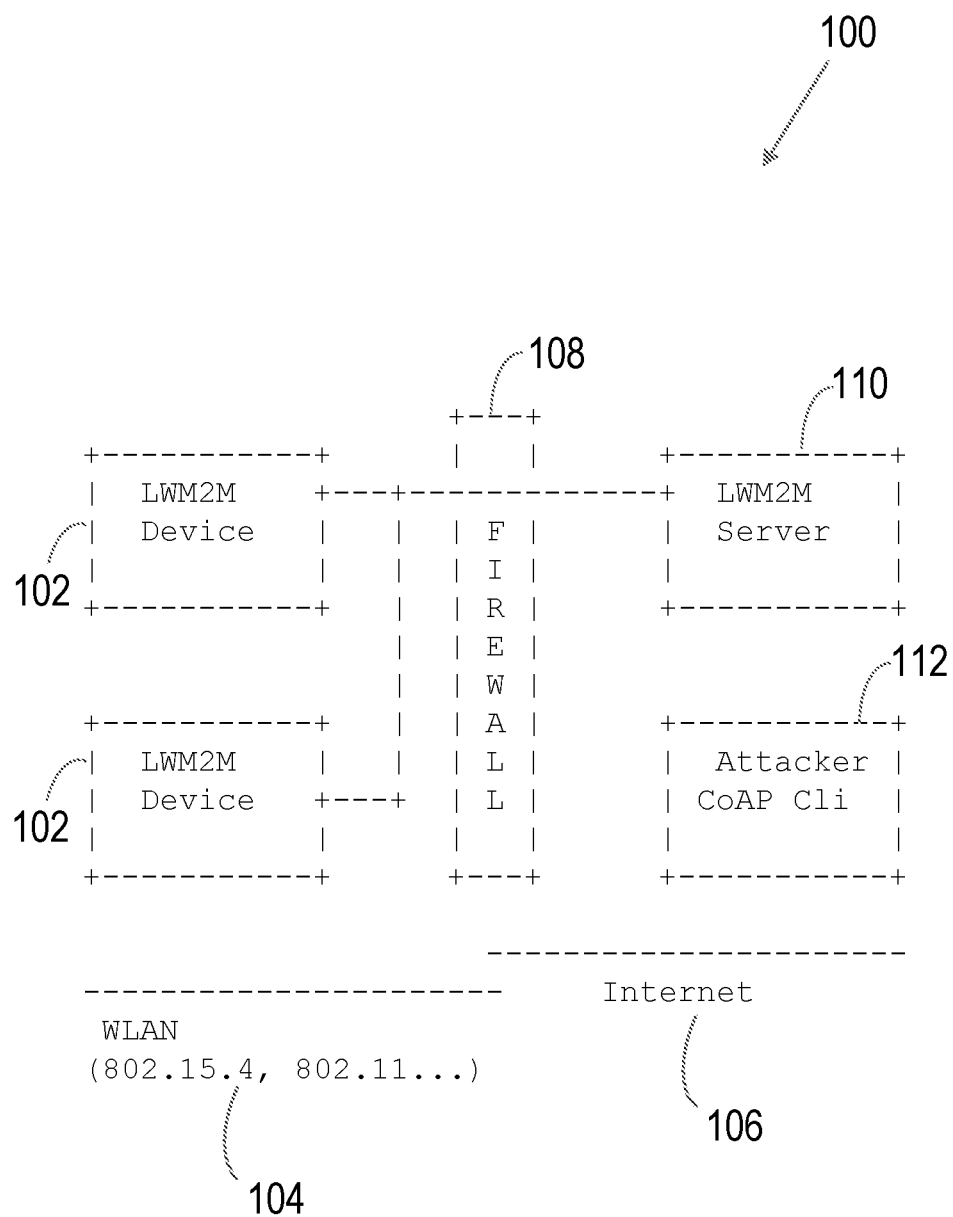
FIG. 1 is a block diagram illustrating a network topology.

FIG. 1 is a block diagram illustrating a network topology 100 within which aspects of the present disclosure may be implemented. Referring to FIG. 1, at least one constrained device 102 is deployed on a local network, which may be a wireless LAN (WLAN) 104. The WLAN 104 is connected to the wider Internet 106 by a firewall 108. The constrained devices 102 are managed using LWM2M, and are therefore illustrated as LWM2M devices. The network topology 100 further comprises a LWM2M server 110 which is connected to the internet 106 and manages the devices 102, communicating with the devices 102 via the firewall 108. Common LWM2M deployments include various LWM2M devices on the same subnet under some form of Home Gateway (for home devices) or under some other private network infrastructure which contains routers which may act as firewalls. The network topology of FIG. 1 is thus a generalised representation of a LWM2M deployment. The network topology 100 also illustrates an attacker 112. The attacker 112 is connected to the internet and may seek to attack a constrained device 102, contacting the constrained device via the firewall 108.

The firewall 108 may be running a PCP server, and may thus be a PCP controlled device. The constrained device may be running a PCP client. It will be appreciated that the PCP client logic for the constrained device is minimal, as the underlying stack is essentially the same as a CoAP based device stack, meaning the constrained device may act as a PCP client while remaining lightweight.

Figure 2:
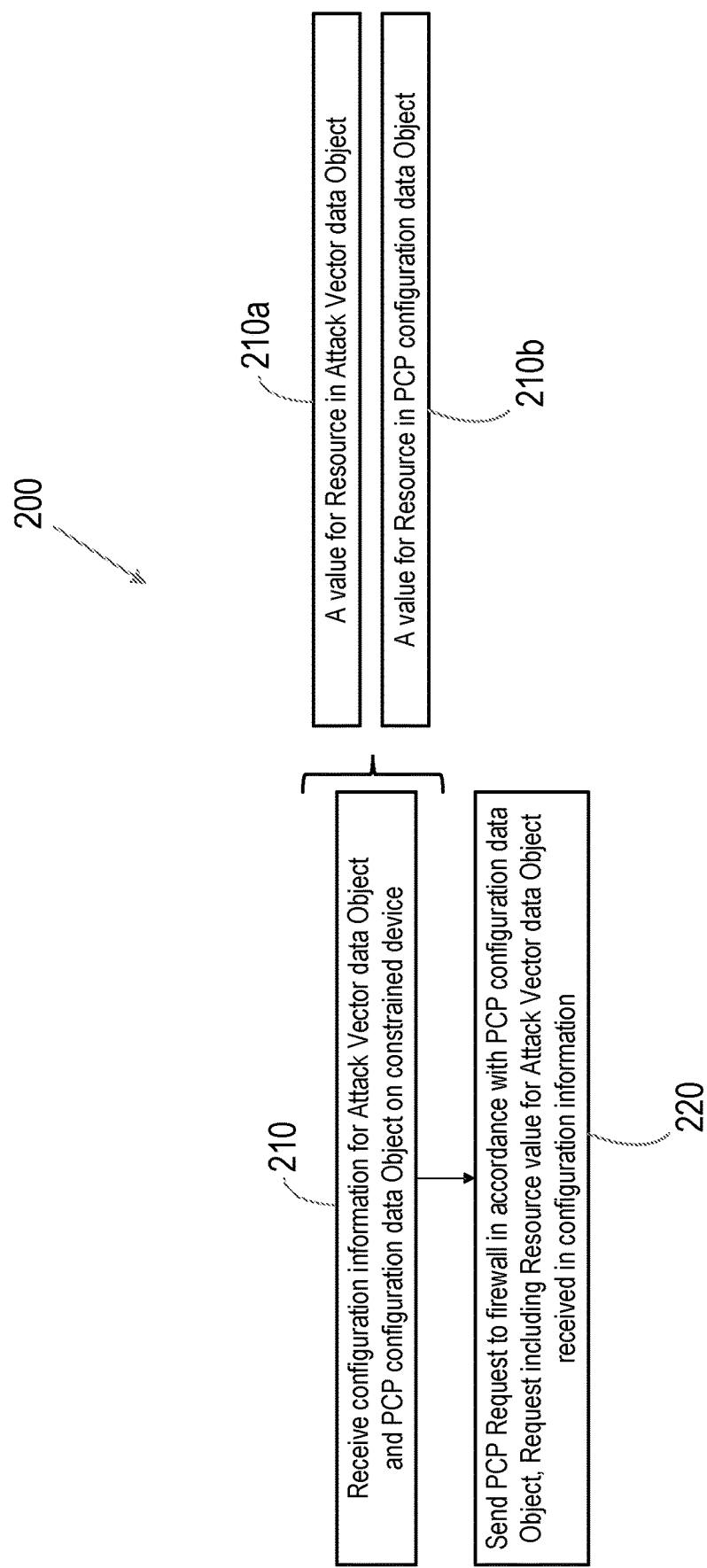
FIG. 2 is a flow chart illustrating process steps in a method for operating a constrained device.

FIG. 2 is a flow chart illustrating process steps in a method 200 for operating a constrained device within a network in accordance with aspects of the present disclosure. The constrained device conducting the method may be a constrained device 102 as illustrated in FIG. 1, and the network may comprise a firewall 108 deployed between the constrained device and a manager 110 of the constrained device, also as illustrated in FIG. 1. The constrained device may be configured to communicate using a RESTful protocol including for example CoAP, MQTT, HTTP etc.

Referring to FIG. 2, the method 200 comprises, in a first step 210, receiving from the manager configuration information for an Attack Vector data object and a PCP configuration data object on the constrained device. The Attack Vector data object and the PCP configuration data object may for example be IPSO objects, in which information is represented as Object/instance/resource. The IPSO object model is an example of a data model which may be used to represent constrained device capabilities and information, as discussed in further detail below with reference to FIGS. 7 and 8. As illustrated in 210a and 210b of FIG. 2, the configuration information received by the constrained device comprises a value for a Resource in the Attack Vector data object and a value for a Resource in the PCP configuration data object. The method further comprises sending a PCP Request to the firewall in accordance with the PCP configuration data object, the PCP Request including the Resource value for the Attack Vector data object received in the configuration information. The PCP Request may include the Attack Vector data object and may include the PCP configuration data object. In some examples of the present disclosure, the constrained device may send the PCP Request as a consequence of being triggered to do so by the manager of the constrained device, for example via execution of a resource in the PCP configuration data object. In other examples, sending the PCP request on receipt of the configuration information from the manager may be a default procedure configured on the constrained device.

Figure 3A:
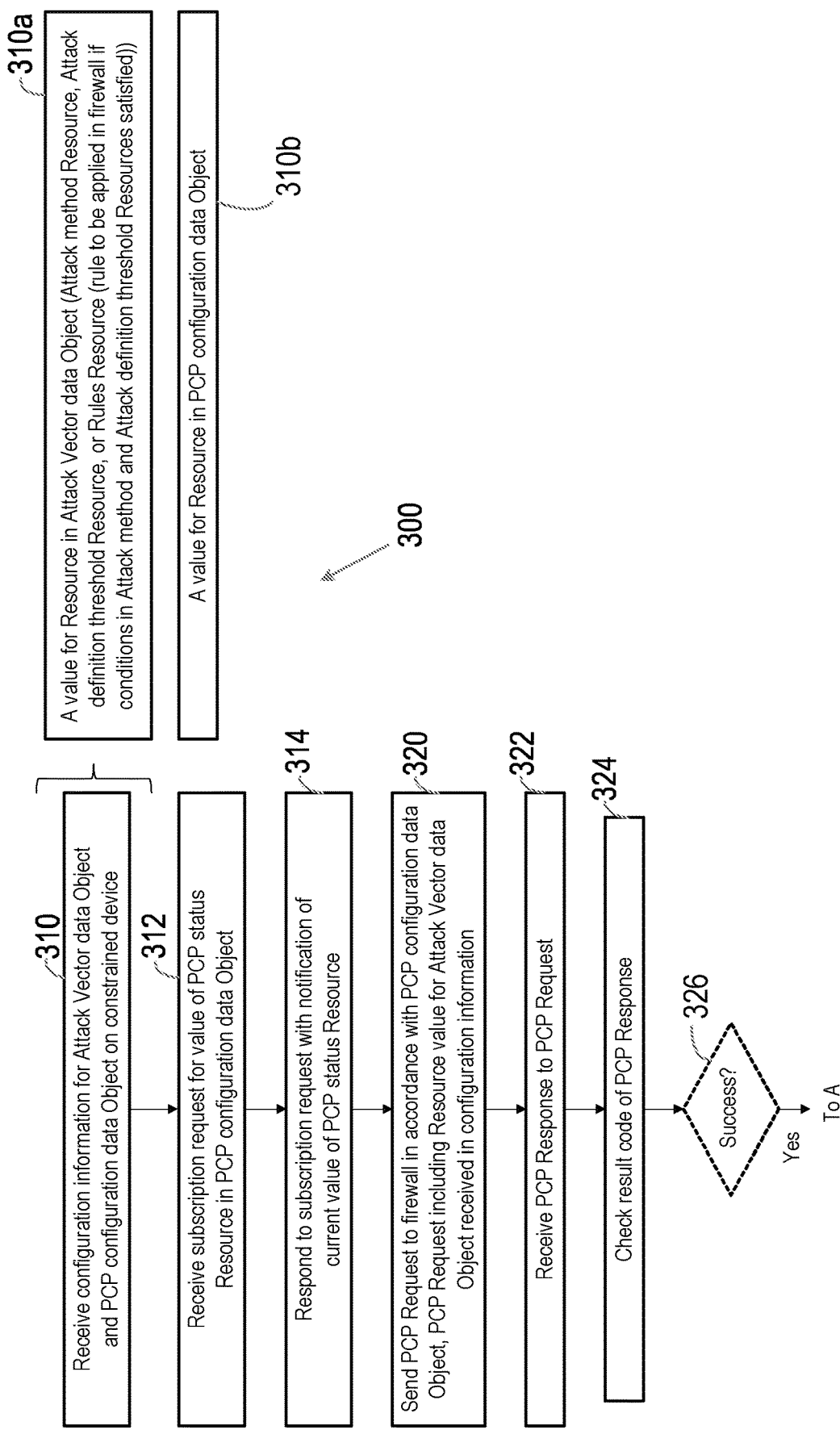
FIGS. 3a and 3b are flow charts illustrating process steps in another example of method for operating a constrained device.
Figure 3B:
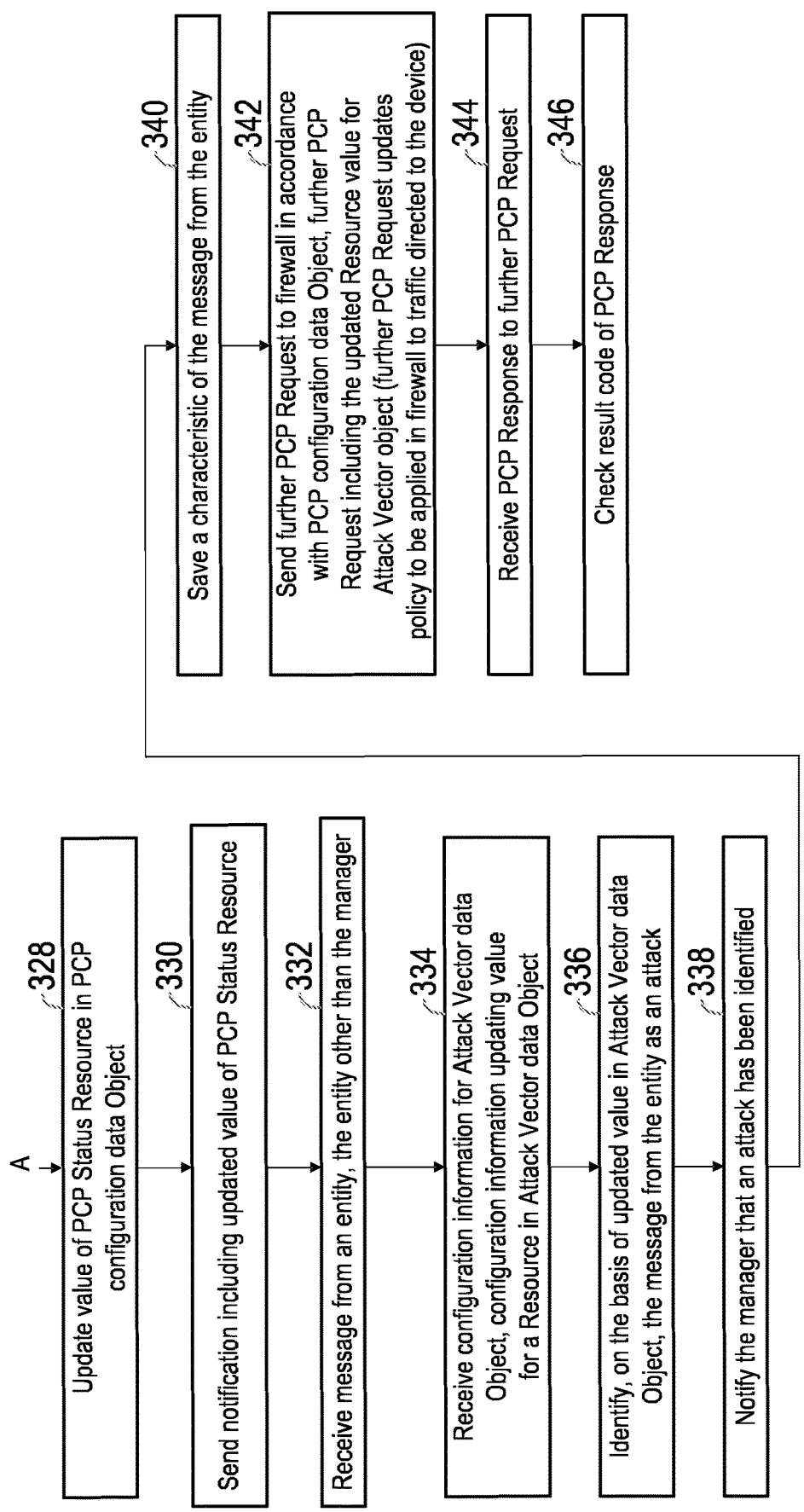

FIGS. 3a and 3b illustrate process steps in another example of a method 300 for operating a constrained device within a network in accordance with aspects of the present disclosure. The steps of the method 300 illustrate one way in which the steps of the method 200 may be subdivided and supplemented in order to achieve the above discussed and additional functionality. As for the method of FIG. 2 above, the constrained device conducting the method 300 may be a constrained device 102 as illustrated in FIG. 1, and the network may comprise a firewall 108 deployed between the constrained device and a manager 110 of the constrained device, also as illustrated in FIG. 1. The constrained device may be configured to communicate using a RESTful protocol including for example CoAP, MQTT, HTTP etc.

Referring to FIG. 3a, in a first step 302, the method 300 comprises receiving from the manager configuration information for an Attack Vector data object and a PCP configuration data object on the constrained device, the configuration information comprising a value for a Resource in the Attack Vector data object and a value for a Resource in the PCP configuration data object, as illustrated at 310a and 310b. In some examples of the present disclosure, the Attack Vector data object and the PCP configuration data object may be initially created on the constrained device by a bootstrapping server during a bootstrapping procedure. The data objects may be created for example within a LWM2M client running on the constrained device. A bootstrapping procedure of this nature is discussed in co-filed patent application number PCT/SE2018/050276

Referring again to FIG. 3a, as illustrated at 310a, the value for a Resource in the Attack Vector data object which is received from the manager may comprise at least one of a value for an Attack method Resource, a value for an Attack definition threshold Resource, or a value for a Rules Resource. The Rules resource may contain a rule to be applied in the firewall in the event of the conditions in the Attack method and Attack definition threshold Resources being satisfied. An example Attack Vector data object is discussed below with reference to FIG. 8. The value for a Resource in the PCP configuration data object may for example comprise a value for an IP Address Resource. The value for the IP Address Resource may be a global IPv6 address for the constrained device. It will be appreciated that values for multiple Resources in each of the data Objects may be received in the configuration information, in addition to values for the above discussed resources.

In step 312, the method 300 comprises receiving from the manager a subscription request for a value of a PCP status Resource in the PCP configuration data Object. The method then comprises, in step 314, responding to the subscription request with a notification to the manager of the current value of the PCP status Resource. The current value of the PCP status Resource may for example indicate that PCP has not yet been enabled on the firewall.

In step 320, the method comprises sending a PCP Request to the firewall in accordance with the PCP configuration data object, the PCP Request including the Resource value for the Attack Vector data object received in the configuration information. The PCP Request may include the Attack Vector data object and may include the PCP configuration data object. The PCP request may contain a policy to be applied in the firewall to traffic directed to the device. The policy may be defined by the resources in the Attack Vector data object, the policy comprising a rule to be applied to traffic directed to the constrained device in the event that conditions relating to the traffic are fulfilled. Those conditions may include an attack method and one of more thresholds applying to the traffic, above which the rule should be applied. In some examples of the present disclosure, the constrained device may send the PCP Request as a consequence of being triggered to do so by the manager of the constrained device, for example via execution of a resource in the PCP configuration data object. In other examples, sending the PCP request on receipt of the configuration information from the manager may be a default procedure configured on the constrained device, for example during the above mentioned bootstrapping procedure.

In step 322, the method 300 comprises receiving a PCP Response to the PCP Request, and in step 324 the method comprises checking a result code of the PCP Response. Referring also to FIG. 3b, if the result code indicates success (Yes at step 326), the method comprises updating a value of a PCP Status Resource in the PCP configuration data Object at step 328. The updated value may indicate successful enablement of PCP on the firewall, establishing a policy to be applied in the firewall to traffic directed to the device.

After updating a value of the PCP Status Resource in the PCP configuration data Object in step 328, the constrained device may then send a notification to the manager including the updated value of the PCP Status Resource in step 330. This notification may sent as an ongoing response to the subscription request received from the manager at step 312.

In step 332, the method comprises receiving a message from an entity, the entity being an entity other than the manager. The message may for example be received from an attacker, such as the attacker 112 in FIG. 1, although the constrained device may at this stage be unable to identify the entity as an attacker. In step 334, the method 300 comprises receiving from the manager configuration information for the Attack Vector data object, the configuration information updating a value for a Resource or Resources in the Attack Vector data object. The updated Resource values may for example include values for the Attack method Resource or the Attack definition threshold Resource, and may additionally include a value for the Rules resource.

In step 336, the method 300 comprises identifying, on the basis of the updated value or values in the Attack Vector data Object, the message from the entity as an attack. The method then comprises notifying the manager that an attack has been identified in step 338 and saving a characteristic of the message from the entity in step 340. Examples of the characteristic or characteristics that may be saved include: origin IP and port of the message from the entity, CoAP endpoint name of the entity, MAC, resources requested in the message etc. In some examples the saved characteristic of the message from the entity may be included in the notification of attack message sent to the manager at step 338.

In step 342, the method 300 comprises sending a further PCP Request to the firewall in accordance with the PCP configuration data object, the further PCP Request including the updated Resource value for the Attack Vector object. As illustrated at step 342, the further PCP Request may update the policy to be applied in the firewall to traffic directed to the device. The policy update may include for example changing thresholds, new attack methods and/or changes to rules to be applied according to the policy for traffic directed to the constrained device. All such updates may be set out in the updated value or values for resources in the Attack Vector object received from the manager at step 334. In some examples, the further PCP request may also include the saved characteristic of the message from the entity. Sending of the further PCP Request may be triggered by the constrained device manager, for example via execution of a resource in the PCP configuration data object. Alternatively, sending of the further PCP request may be configured in the constrained device as an automatic procedure on update of the Attack Vector object, or may be based on incoming traffic to the constrained device.

The method 300 further comprises receiving a PCP Response to the further PCP Request in step 344, and, in step 346, checking a result code of the PCP Response. If the result code indicates success, the method may comprise updating a value of a PCP Status Resource in the PCP configuration data Object as discussed above with reference to step 328. The updated value may indicate successful updating of the policy to be applied in the firewall to traffic directed to the device. After updating a value of the PCP Status Resource in the PCP configuration data Object, the constrained device may then send a notification to the manager including the updated value of the PCP Status Resource. This notification may be sent as an ongoing response to the subscription request received from the manager at step 312.

The method 300, conducted in a constrained device, may be complimented by methods 400 and/or 500 conducted in a manager, as discussed below with reference to FIGS. 4 and 5.

Figure 4:
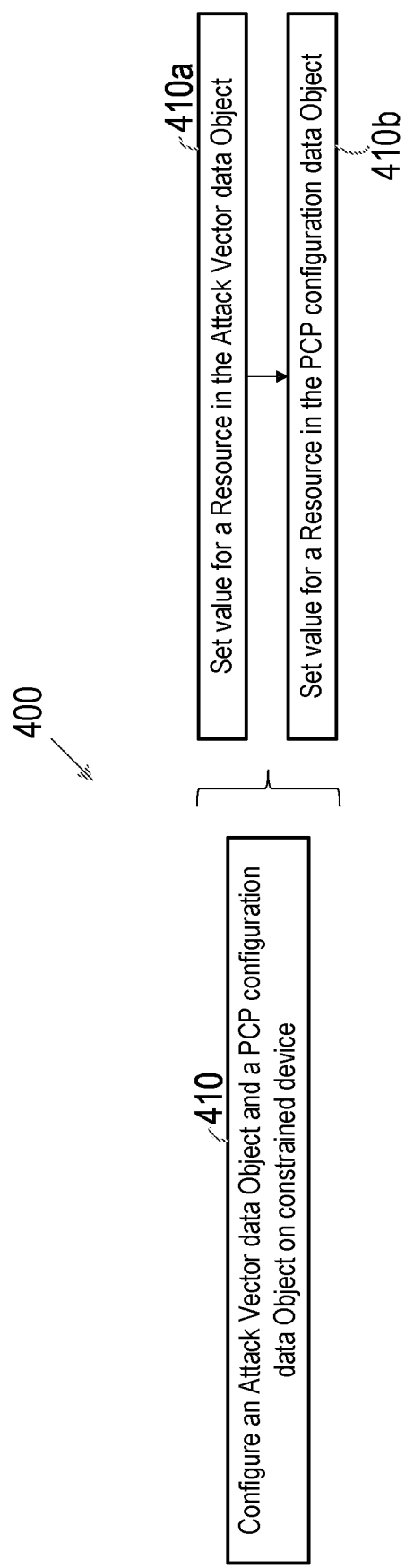
FIG. 4 is a flow chart illustrating process steps in a method for managing a constrained device.

FIG. 4 is a flow chart illustrating process steps in a method 400 for managing a constrained device within a network in accordance with aspects of the present disclosure. The method may be conducted by a manager, which may be running a LWM2M server such as the LWM2M server 110 of FIG. 1. The constrained device managed according to the method may be a constrained device 102 as illustrated in FIG. 1, and the network may comprise a firewall 108 deployed between the constrained device and the manager of the constrained device, also as illustrated in FIG. 1. The constrained device may be configured to communicate using a RESTful protocol including for example CoAP, MQTT, HTTP etc.

Referring to FIG. 4, the method 400 comprises, in step 410, configuring an Attack Vector data object and a PCP configuration data object on the constrained device. The configuration at step 410 is performed by setting a value for a Resource in the Attack Vector data object in step 410a and setting a value for a Resource in the PCP configuration data object in step 410b. The Attack Vector data object and the PCP configuration data object may for example be IPSO objects, in which information is represented as Object/instance/resource. The IPSO object model is an example of a data model which may be used to represent constrained device capabilities and information, as discussed in further detail below with reference to FIGS. 7 and 8. The data objects may be configured within a LWM2M client running on the constrained device.

Figure 5A:
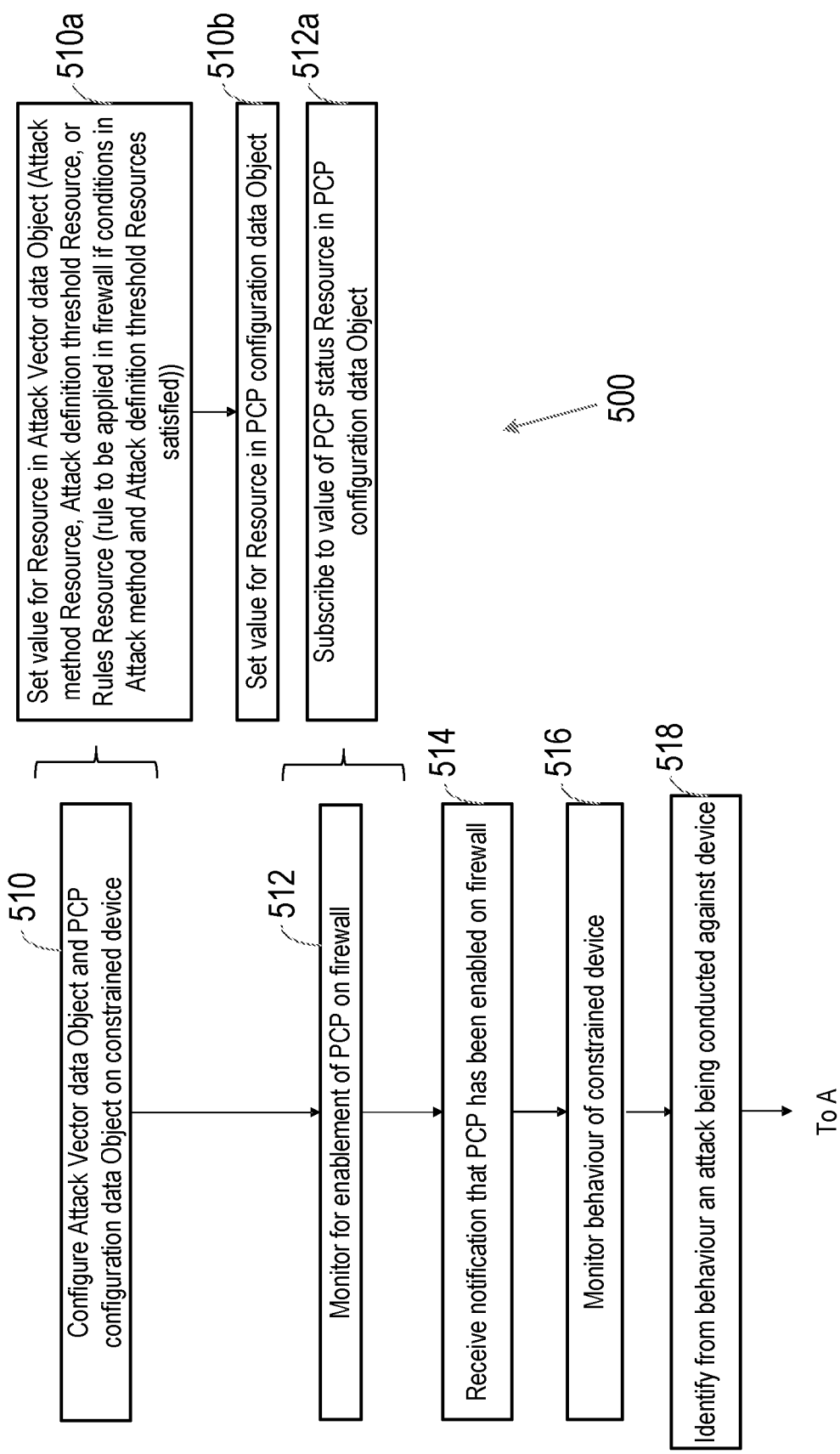
FIGS. 5a and 5b are a flow charts illustrating process steps in another example of method for managing a constrained device.
Figure 5B:
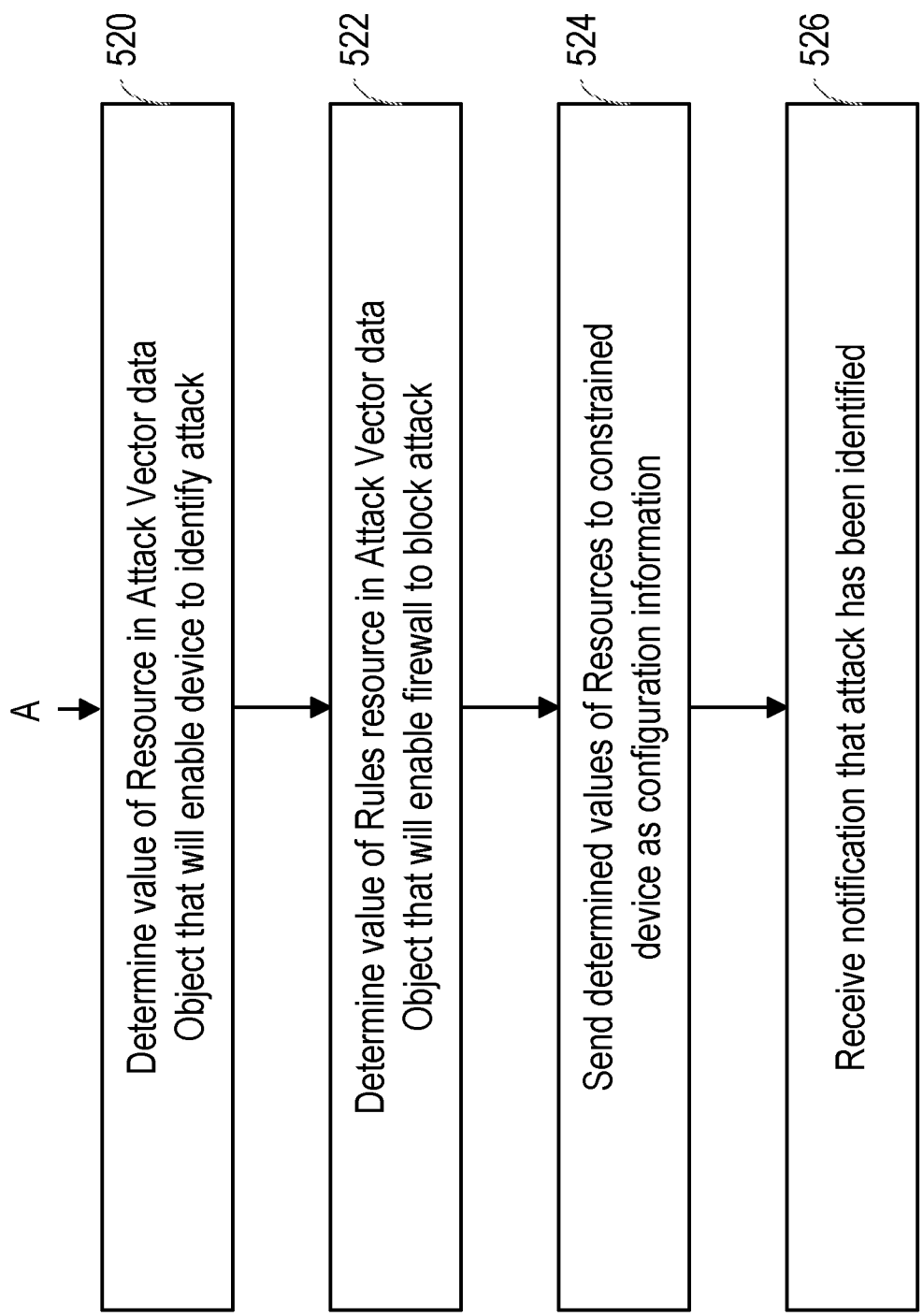

FIGS. 5a and 5b illustrate process steps in another example of a method 500 for managing a constrained device within a network in accordance with aspects of the present disclosure. The steps of the method 500 illustrate one way in which the steps of the method 400 may be subdivided and supplemented in order to achieve the above discussed and additional functionality. As for the method of FIG. 4 above, the method may be conducted by a manager, which may be running a LWM2M server such as the LWM2M server 110 of FIG. 1. The constrained device managed according to the method may be a constrained device 102 as illustrated in FIG. 1, and the network may comprise a firewall 108 deployed between the constrained device and the manager of the constrained device, also as illustrated in FIG. 1. The constrained device may be configured to communicate using a RESTful protocol including for example CoAP, MQTT, HTTP etc.

Referring to FIG. 5a, in a first step 510, the method 500 comprises configuring an Attack Vector data object and a PCP configuration data object on the constrained device. The configuration at step 510 is performed by setting a value for a Resource in the Attack Vector data object in step 510a and setting a value for a Resource in the PCP configuration data object in step 510b. In some examples of the present disclosure, the Attack Vector data object and the PCP configuration data object may be initially created on the constrained device by a bootstrapping server during a bootstrapping procedure. The data objects may be created for example within a LWM2M client running on the constrained device. A bootstrapping procedure of this nature is discussed in co-filed patent application number PCT/SE2018/050276

Referring again to FIG. 5a, as illustrated at 510a, the value for a Resource in the Attack Vector data object which is set by the manager may comprise at least one of a value for an Attack method Resource, a value for an Attack definition threshold Resource, or a value for a Rules Resource. The Rules resource may contain a rule to be applied in the firewall in the event of the conditions in the Attack method and Attack definition threshold Resources being satisfied. An example Attack Vector data object is discussed below with reference to FIG. 8. The value for a Resource in the PCP configuration data object may for example comprise a value for an IP Address Resource. The value for the IP Address Resource may be a global IPv6 address for the constrained device. It will be appreciated that values for multiple Resources in each of the data Objects may be set as part of the configuring step 510, in addition to values for the above discussed resources.

In some examples of the present disclosure, the method 500 may further comprise triggering the constrained device to send a PCP Request to the firewall, for example via execution of a resource in the PCP configuration data object. In other examples, sending a PCP request on receipt of the configuration information from the manager may be a default procedure configured on the constrained device, for example during the above mentioned bootstrapping procedure.

In step 512, the method 500 comprises monitoring for successful enablement of PCP on the firewall. Such enablement may indicate that a policy to be applied in the firewall to traffic directed to the device has been established. As illustrated at 512a, monitoring for successful enablement of PCP on the firewall may comprise subscribing to a value of a PCP status Resource in the PCP configuration data Object on the constrained device.

In step 514, the method 500 comprises receiving a notification from the constrained device that PCP has been successfully enabled on the firewall, the notification may for example be a subscription notification of a change in the value of the PCP Status Resource.

In step 516 the method 500 comprises monitoring behaviour of the constrained device. This may include monitoring traffic to and from the constrained device, attempts by the constrained device to access resources etc. In step 518, the method 500 comprises identifying from the monitored behaviour an attack being conducted against the constrained device. An attack may be identified for example on the basis of attempts by the constrained device to access restricted resources, repeated attempts by the same constrained device to access the same resources, an excessive number of resource requests etc. In step 520, the manager determines a value of a Resource in the Attack Vector data object on the constrained device that will enable the device to identify the attack. This may for example comprise determining an updated value for at least one of an Attack method Resource or an Attack definition threshold Resource. In step 522, the manager determines a value of a Rules resource in the Attack Vector data Object on the constrained device that will enable the firewall to block the attack. In step 524, the method comprises sending the determined values of the Resources to the constrained device as configuration information. The manager may also trigger the sending or a new PCP request to the firewall with the updated resource values. Alternatively, the sending of a new PCP request may be configured into the constrained device as an automatic procedure on update of the Attack Vector data object, or may be based upon incoming traffic to the constrained device.

In step 526, the method 500 comprises receiving a notification from the constrained device that an attack has been identified. A saved characteristic of a message identified by the device as part of the attack may be included in the notification of attack message sent to the manager. In some examples, the manager may also receive a notification from the constrained device that a policy in the firewall has been successfully updated according to the updated resource values sent by the manager to the constrained device in step 524.

Examples of the methods 200, 300, 400, 500 may cooperate to enable a manager of a constrained device to cause the constrained device to configure a firewall monitoring traffic to the device. The constrained device may establish a policy on the firewall for traffic to the device, which policy may be updated following detection by the manager of an attack against the constrained device. The manager may determine policy changes that would enable the firewall to block the attack and may communicate those policy changes to the constrained device by updating values in resources of an Attack Vector data object configured on the constrained device. The policy changes may be communicated to the firewall via a PCP request from the constrained device to the firewall.

The methods discussed above take advantage of the configuration possibilities of PCP without requiring significant additional complexity in the constrained device. As discussed above, the PCP client logic for the constrained device is minimal, as the underlying stack is essentially the same as a CoAP based device stack, meaning the constrained device may act as a PCP client while remaining lightweight. The logic for determining appropriate resource values to enable identification and blocking of an attack is located in the manager, which may be running a LWM2M server. The constrained device then communicates those resource values to the firewall via PCP requests.

Figure 6:
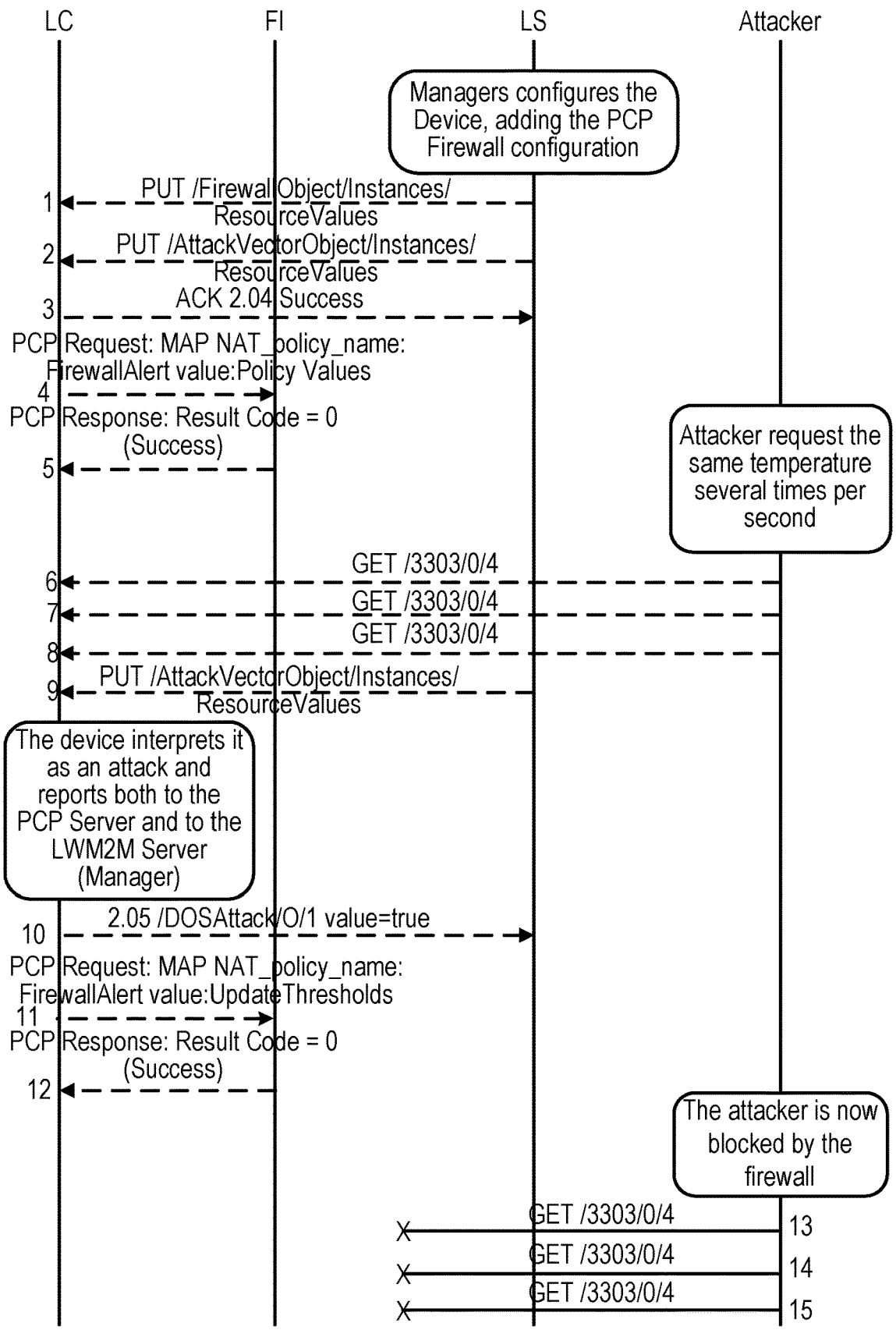
FIG. 6 is a message flow diagram.

FIG. 6 is a message flow diagram illustrating an example implementation of the methods discussed above. In the message flow diagram of FIG. 6, the element LC represents a constrained device, on which is running a LWM2M client, a CoAP server and a PCP client. The element FI represents a firewall hosting a PCP server. The element LS represents a manager on which is running a LWM2M server and a CoAP client. The message flow of FIG. 6 refers to a PCP configuration data object (Firewall object) having the format of the example PCP configuration object 700 illustrated in FIG. 7, and to an Attack Vector data object having the format of the example Attack Vector data object 800 illustrated in FIG. 8. References in messages of FIG. 6 to specific resources are to the resource identifiers as illustrated in the example objects of FIGS. 7 and 8.

Referring to FIG. 6, it is assumed that the constrained device has already been correctly bootstrapped and configured with the LWM2M Server, and that the firewall supports PCP. It is also assumed that the constrained device, firewall and LWM2M server are PCP aware.

In messages 1 and 2 of FIG. 6, the LWM2M server configures the Firewall object and Attack vector object on the constrained device, writing values into the resources of the data objects. The configuration of the data objects is acknowledged by the constrained device in message 3. In message 4, the constrained device sends a PCP request to the Firewall, using the information in the Firewall object to set a rule on the PCP server of the firewall. In PCP this type of configuration is called "MAP", and an example of a valid MAP configuration with the rules to be applied to specific thresholds is shown below:
NAT_policy_name FirewallAlert
    threshold poll firewall-deny-rule
    threshold poll firewall-dos-attack
    threshold poll firewall-drop-packet
    threshold poll firewall-no-rule In message 5, the Firewall sends a PCP response with the result code 0 to indicate successful configuring of the Firewall.

An attacker then starts sending multiple queries to the constrained device, illustrated at messages 6, 7 and 8. These queries may for example be GET, POST, PUT, DELETE operations etc. In FIG. 6, the operations are requests for the same temperature resource and are received several times per second. If the policy configured on the firewall in steps 4 to 5 were to recognise these messages as an attack then they would be blocked in accordance with the rule or rules forming part of the policy established on the firewall via the preceding message exchange. However, if the messages do not fulfil the conditions for an attack definition according to the policy on the firewall then they will be allowed through to the constrained device. The LWM2M server, monitoring the behaviour of the constrained device identifies from that behaviour that the device is undergoing an attack. This may be identified on the basis of the messages themselves (too many queries sent to the device within a certain time frame), or may be identified on the basis of the device's behaviour in response to the messages (multiple attempts to access the same resource). The LWM2M server determines what changes need to be made in the Attack Vector resource values to enable both the constrained device and the firewall to identify the messages as an attack. The LWM2M server then updates the values in the Attack Vector object on the constrained device accordingly in message 9.

On the basis of the updated resource values in the attack vector object, the constrained device is now able to identify the messages as an attack, for example identifying that the messages represent too many queries per unit time and that none of the queries can be served. The constrained device saves the origin IP and port of the messages and may save other characteristics such as CoAP endpoint name, MAC, resources used etc. The constrained device then notifies the LWM2M server of the attack in message 10. This notification may be based on an attack report object, illustrated in FIG. 6 as a "DOS Attack" object. Such an object may be configured on the device with an attack notification resource. On identifying an attack, the constrained device may update the value of this resource to be true, representing an ongoing attack. The LWM2M server may subscribe to notifications for this resource, thus ensuring the constrained device will send the notification of message 10 when it updates the value of the resource on identifying the attack.

Figures 9, 10:
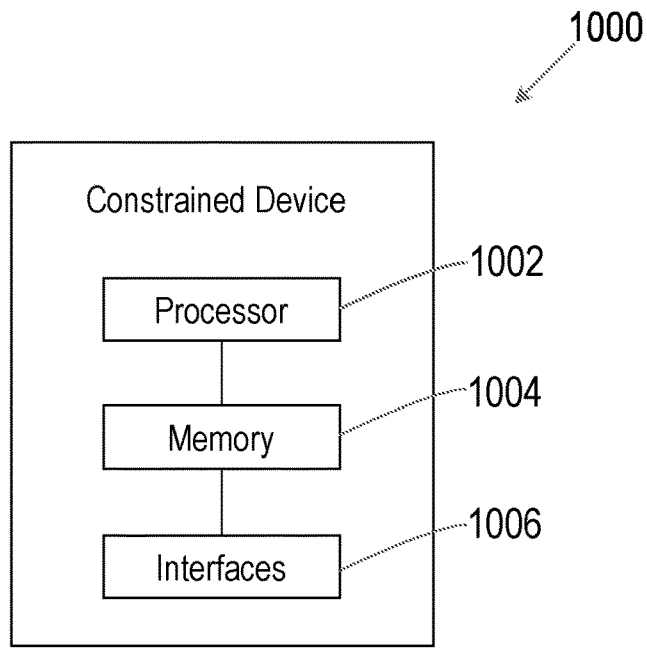
FIG. 9 is a representation of an example packet format.
FIG. 10 is a block diagram illustrating functional units in a constrained device.

The constrained device then sends a new PCP request to the Firewall in message 11. The new PCP request includes the updated resource values received from the LWM2M manager to update the policy on the firewall relating to traffic for the constrained device. The request would contain the Operation Code ANNOUNCE and a modification of the threshold and/or the new policy name. The policy could be expressed with the PCP "FILTER" option as illustrated in FIG. 9. The Firewall acknowledges the updates to the policy in message 12.

The updated policy in the Firewall allows the firewall to identify the messages of the attack as being malicious, and to block these messages before they reach the constrained device, as illustrated in messages 13, 14 and 15.

The message flow of FIG. 6 illustrates how aspects of the present disclosure enable a constrained device to take action when subjected to an attack. Without the methods of the present disclosure, a constrained device subject to a Denial of Service (DoS) attack, for example a constrained device subjected to an excessive number of queries to which it cannot respond, has no option but to crash. The device is unable to inform its manager of the attack or to do anything to prevent the attack. According to examples of the present disclosure, the constrained device may be configured to recognise the attack and to configure its firewall such that the attack traffic may be blocked. If an initial policy configured on the firewall is insufficient to block an attack, this may be detected by the LWM2M server, which can then determine appropriate new values for the policy in the firewall and cause the constrained device to update the policy with these values by updating the values in the Attack vector object.

FIG. 7 illustrates an example of a PCP configuration data object 700. The "Firewall Object" of FIG. 7 may have the format of the example PCP configuration data object 700. Information in the example PCP configuration data object is contained in LWM2M/IPSO format. Referring to FIG. 7, the example PCP Configuration data object 700 comprises a plurality of Resources 702. The first resource (Resource ID 0) is a PCP Version Resource 704. This is an Integer type resource the value of which indicates a supported version of PCP; its default value is 2. The second resource (Resource ID 1) is named Resource R 706. This is a Boolean type resource specifying a message type; for example a resource value of 0 may specify a Request message. The third resource (Resource ID 2) is an IP Address Resource 708. This is a Long type resource providing an IP address of the constrained device. The IP address may for example be a global IPv6 address. The fourth resource (Resource ID 3) is a PCP Option Resource 710. This is an Opaque type resource which is used to describe the PCP option to be used for a given PCP message. The option may for example be FILTER, as discussed below. The fifth resource (Resource ID 4) is a PCP Status Resource 712. This is a Boolean type resource, a value of which may indicate whether or not PCP has been successfully enabled and a firewall policy configured. If PCP has been successfully enabled, the value of this resource may be 1. Other examples of PCP configuration data object may include different or additional Resources to those illustrated.

FIG. 8 illustrates an example of an Attack Vector data object 800. Information in the example Attack vector data object is contained in LWM2M/IPSO format. Referring to FIG. 8, the example Attack Vector data object 800 comprises a plurality of Resources 802. The first resource (Resource ID 0) is an Attack Methods Resource 704. This is a String array type resource listing possible methods of attack. The default value for this resource may be GET only, however other operations may also be included in this array list, including for example PUT, POST, DELETE etc. The second resource (Resource ID 1) is a Request Threshold Resource 706. This is an Integer type resource specifying a number of allowed requests per minute and per CoAP client. The default value for this resource may be 30. Together the first and second resources define the conditions for an attack. The third resource (Resource ID 2) is a Rules Resource 708. This is a String type resource specifying the rule to be applied if the conditions in Resources 0 and 1 are met. An example default value for this resource is: threshold poll firewall-dos-attack.

FIG. 9 illustrates an example request packet format 900 for the further PCP request message which may be sent by a constrained device including updates to a firewall policy. The message 11 of FIG. 6 may have the packet format illustrated in FIG. 9. Referring to FIG. 9, the illustrated request packet includes the option code 3 corresponding to the FILTER option of PCP, and includes as payload the new threshold values or other updated resource values for the Attack Vector object received from the manager following identification of an attack.

As discussed above, the methods 200, 300 may be performed by a constrained device. FIG. 10 is a block diagram illustrating an example constrained device 1000 which may implement the methods 200, 300 according to examples of the present disclosure, for example on receipt of suitable instructions from a computer program. Referring to FIG. 10, the constrained device 1000 comprises a processor 1002, a memory 1004 and interfaces 1006. The memory 1004 contains instructions executable by the processor 1002 such that the constrained device 1000 is operative to conduct some or all of the steps of the method 200 and/or 300.

Figure 11:
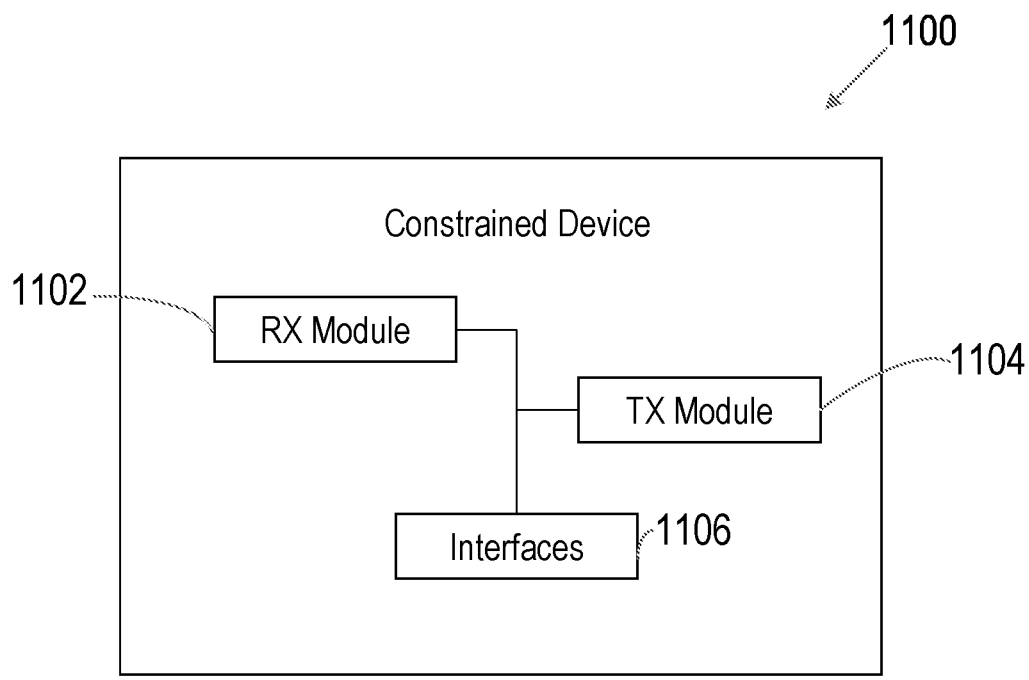
FIG. 11 is a block diagram illustrating functional units in another example of constrained device.

FIG. 11 illustrates functional units in another example of constrained device 1100 which may execute examples of the methods 200, 300 of the present disclosure, for example according to computer readable instructions received from a computer program. It will be understood that the units illustrated in FIG. 11 are functional units, and may be realised in any appropriate combination of hardware and/or software. The units may comprise one or more processors and may be integrated to any degree.

Referring to FIG. 11, the constrained device 1100 comprises a receiving module 1102 for receiving from a manager configuration information for an Attack Vector data Object and a PCP configuration data Object on the constrained device. The configuration information comprises a value for a Resource in the Attack Vector data Object and
  a value for a Resource in the PCP configuration data Object. The constrained device also comprises a transmission module 1104 for sending a PCP Request to a firewall in accordance with the PCP configuration data Object, the PCP Request including the Resource value for the Attack Vector object received in the configuration information. The constrained device also comprises interfaces 1106.

Also as discussed above, the methods 400, 500 may be performed by a constrained device manager. The manager may be a single element or may be part of a distributed management function, which may for example be a Virtualized Network Function.

Figure 12:
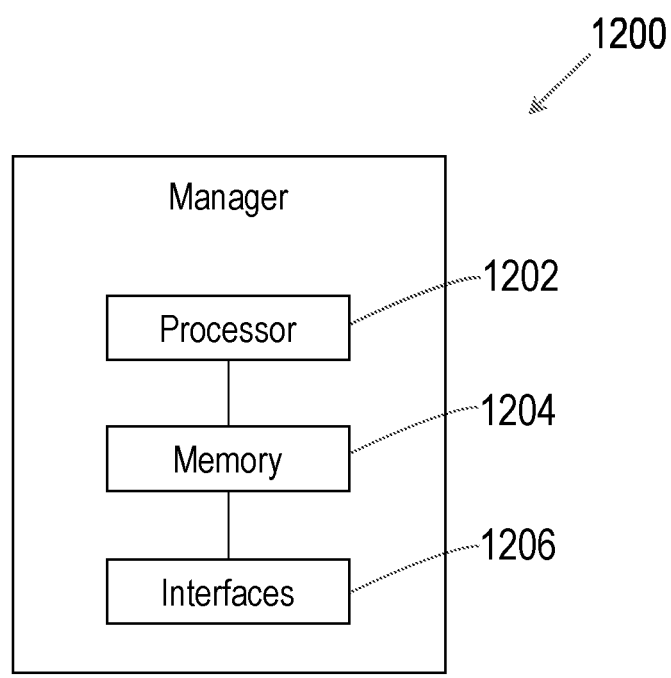
FIG. 12 is a block diagram illustrating functional units in a manager.

FIG. 12 is a block diagram illustrating an example manager 1200 which may implement the methods 400, 500 according to examples of the present disclosure, for example on receipt of suitable instructions from a computer program. Referring to FIG. 12, the manager 1200 comprises a processor 1202, a memory 1204 and interfaces 1206. The memory 1204 contains instructions executable by the processor 1202 such that the manager 1200 is operative to conduct some or all of the steps of the method 400 and/or 500.

Figure 13:
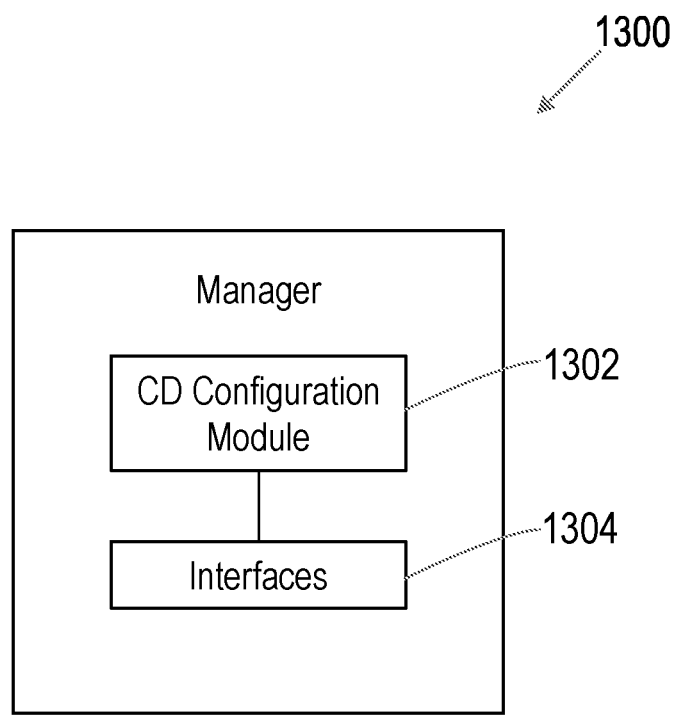
FIG. 13 is a block diagram illustrating functional units in another example of manager.

FIG. 13 illustrates functional units in another example of manager 1300 which may execute examples of the methods 400, 500 of the present disclosure, for example according to computer readable instructions received from a computer program. It will be understood that the units illustrated in FIG. 13 are functional units, and may be realised in any appropriate combination of hardware and/or software. The units may comprise one or more processors and may be integrated to any degree.

Referring to FIG. 13, the manager 1300 comprises a configuration module 1302 and interfaces 1304. The configuration module 1302 is for configuring an Attack Vector data Object and a PCP configuration data Object on the constrained device by setting a value for a Resource in the Attack Vector data Object and setting a value for a Resource in the PCP configuration data Object.

Aspects of the present disclosure provide methods according to which a constrained device may be configured to identify an attack directed against the constrained device, to notify a manager of the attack and to take action to block the attack, by configuring or updating a policy on a firewall serving the constrained device. Traffic monitoring, configuration and determining of appropriate policy rules for the firewall may be performed by a constrained device manager, placing minimal extra demands on the constrained device, which receives configuration information and acts accordingly.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for operating a constrained device within a network, the network comprising a firewall deployed between the constrained device and a manager, the method, performed by the constrained device, comprising:
    receiving from the manager configuration information for an Attack Vector data Object and a Port Control Protocol (PCP) configuration data Object on the constrained device, the configuration information comprising:
        a value for a Resource in the Attack Vector data Object, indicating at least one of a method of attack and a corresponding firewall rule to be applied for blocking attack traffic; and
        a value for a Resource in the PCP configuration data Object;
    sending a PCP Request to the firewall in accordance with the PCP configuration data Object, the PCP Request including the Resource value for the Attack Vector data Object received in the configuration information;
    receiving from the manager a subscription request for a value of a PCP status Resource in the PCP configuration data Object; and
    responding to the subscription request with a notification to the manager of the current value of the PCP status Resource.

2. The method as claimed in claim 1, wherein the value for a Resource in the Attack Vector data Object comprises a corresponding threshold associated with the method of attack.

3. The method as claimed in claim 2, wherein the corresponding firewall rule is applied in the event that conditions associated with the method of attack and the corresponding threshold are satisfied.

4. The method as claimed in claim 1, wherein the PCP Request contains a policy to be applied in the firewall to traffic directed to the constrained device.

5. The method as claimed in claim 1, further comprising:
    receiving a PCP Response to the PCP Request;
    checking a result code of the PCP Response; and
    if the result code indicates success, updating a value of a PCP Status Resource in the PCP configuration data Object.

6. The method as claimed in claim 1, further comprising:
    receiving a PCP Response to the PCP Request;
    checking a result code of the PCP Response; and
    if the result code indicates success, updating a value of a PCP Status Resource in the PCP configuration data Object; and
    on updating a value of the PCP Status Resource in the PCP configuration data Object, sending a notification to the manager including the updated value of the PCP Status Resource.

7. The method as claimed in claim 1, further comprising:
    receiving a message from an entity, the entity other than the manager; and
    receiving from the manager configuration information for the Attack Vector data Object, the configuration information updating a value for a Resource in the Attack Vector data Object; and
    identifying, on the basis of the updated value in the Attack Vector data Object, the message from the entity as an attack.

8. The method as claimed in claim 7, further comprising:
    notifying the manager that an attack has been identified;
    saving a characteristic of the message from the entity.

9. The method as claimed in claim 7, further comprising:
    sending a further PCP Request to the firewall in accordance with the PCP configuration data Object, the further PCP Request including the updated Resource value for the Attack Vector object
    receiving a PCP Response to the further PCP Request;
    checking a result code of the PCP Response.

10. The method as claimed in claim 9, wherein the PCP Request contains a policy to be applied in the firewall to traffic directed to the constrained device, and wherein the further PCP Request updates the policy to be applied in the firewall to traffic directed to the constrained device.

11. A method for managing a constrained device within a network, the network comprising a firewall deployed between the constrained device and a manager, the method, performed by the manager, comprising:
    configuring an Attack Vector data Object and a Port Control Protocol (PCP) configuration data Object on the constrained device by:
        setting a value for a Resource in the Attack Vector data Object, indicating at least one of a method of attack and a corresponding firewall rule to be applied for blocking attack traffic; and
        setting a value for a Resource in the PCP configuration data Object;
    monitoring for successful enablement of PCP on the firewall; and
    receiving a notification from the constrained device that PCP has been successfully enabled on the firewall;
    wherein monitoring for successful enablement of PCP on the firewall comprises subscribing to a value of a PCP status Resource in the PCP configuration data Object on the constrained device.

12. The method as claimed in claim 11, wherein the value for the first Resource in the Attack Vector data Object comprises a corresponding threshold associated with the method of attack.

13. The method as claimed in claim 12, wherein the corresponding firewall rule is applied in the event that conditions associated with the method of attack and the corresponding threshold are satisfied.

14. The method as claimed in claim 11, further comprising:
monitoring behaviour of the constrained device;
identifying from the behaviour an attack being conducted against the constrained device;
determining an update in the Attack Vector data Object on the constrained device that will enable the constrained device to identify the attack; and
sending the update to the constrained device as configuration information, wherein determining the update comprises updating the method of attack or its corresponding threshold.

15. The method as claimed in claim 14, further comprising:
updating the firewall rule in the Attack Vector data Object on the constrained device that will enable the firewall to block the attack;
sending the updated firewall rule to the constrained device as configuration information; and
receiving a notification from the constrained device that an attack has been identified.

16. A constrained device, the constrained device being operable for deployment within a network, the network comprising a firewall deployed between the constrained device and a manager, the constrained device comprising a processor and a memory, the memory containing instructions executable by the processor such that the constrained device is operable to:
receive from the manager configuration information for an Attack Vector data Object and a Port Control Protocol (PCP) configuration data Object on the constrained device, the configuration information comprising:
a value for a Resource in the Attack Vector data Object, indicating at least one of a method of attack and a corresponding firewall rule to be applied for blocking attack traffic; and
a value for a Resource in the PCP configuration data Object;
send a PCP Request to the firewall in accordance with the PCP configuration data Object, the PCP Request including the Resource value for the Attack Vector object received in the configuration information;
receive from the manager a subscription request for a value of a PCP status Resource in the PCP configuration data Object; and
respond to the subscription request with a notification to the manager of the current value of the PCP status Resource.

17. A manager for managing a constrained device within a network, the network comprising a firewall deployed between the constrained device and the manager, the manager comprising a processor and a memory, the memory containing instructions executable by the processor such that the manager is operable to:
configure an Attack Vector data Object and a Port Control Protocol, PCP, configuration data Object on the constrained device by:
setting a value for a Resource in the Attack Vector data Object, indicating at least one of a method of attack and a corresponding firewall rule to be applied for blocking attack traffic; and
setting a value for a Resource in the PCP configuration data Object;
monitor for successful enablement of PCP on the firewall; and
receive a notification from the constrained device that PCP has been successfully enabled on the firewall;
wherein monitoring for successful enablement of PCP on the firewall comprises subscribing to a value of a PCP status Resource in the PCP configuration data Object on the constrained device.

\* \* \* \* \*